United States Patent [19]

Brown et al.

[11] Patent Number: 4,853,884
[45] Date of Patent: Aug. 1, 1989

[54] RANDOM NUMBER GENERATOR WITH DIGITAL FEEDBACK

[75] Inventors: Daniel P. Brown, Elmhurst; Carl M. Danielsen, Lake Zurich; Ezzat A. Dabbish, Buffalo Grove, all of Ill.

[73] Assignee: Motorola, Inc., Schaumburg, Ill.

[21] Appl. No.: 95,088

[22] Filed: Sep. 11, 1987

[51] Int. Cl.[4] .......................... G06V 1/00; G06F 7/58; H03B 29/00
[52] U.S. Cl. .................................... 364/602; 331/78; 364/717
[58] Field of Search ............... 364/602, 607, 600, 717; 331/78; 380/46

[56] References Cited

U.S. PATENT DOCUMENTS

| | | | |
|---|---|---|---|
| 3,582,882 | 6/1971 | Titcomb et al. | 331/78 X |
| 3,758,873 | 9/1973 | Miller | 331/78 |
| 3,946,215 | 3/1976 | May | 331/78 X |
| 4,176,399 | 11/1979 | Hoffmann et al. | 364/717 |
| 4,247,946 | 1/1981 | Mawhinney | 331/78 X |
| 4,375,620 | 3/1983 | Singer et al. | 331/78 |
| 4,395,703 | 7/1983 | Piosenka | 340/347 |
| 4,477,912 | 10/1984 | Russell | 380/46 X |
| 4,484,297 | 11/1984 | Maier et al. | 364/717 |
| 4,499,551 | 2/1985 | Frank | 364/717 |
| 4,571,556 | 2/1986 | Gnerlich et al. | 331/78 |
| 4,578,598 | 3/1986 | Faulhaber | 307/271 |
| 4,611,183 | 9/1986 | Piosenka | 331/78 |

OTHER PUBLICATIONS

Beker, H. and Piper, F., Cipher Systems-*The Protection of Communications* (New York, John Wiley & Sons, 1982), pp. 169-174.

*Primary Examiner*—Joseph Ruggiero
*Attorney, Agent, or Firm*—Douglas A. Boehm; Steven G. Parmelee; Anthony J. Sarli, Jr.

[57] ABSTRACT

A zener diode random number generator circuit is described which produces a random binary number output having a statistical distribution exhibiting a controlled degree of randomness determined in response to an input control signal. A microprocessor feedback circuit monitors the random number output and produces the input control signal in response to the difference between the degree of randomness of the output signal and that of a pre-determined statistical distribution. The digital feedback automatically adjusts the zener diode biasing point and the limiter threshold such that part-to-part tolerance, component aging, temperature variations, or voltage fluctuations will not adversely affect the randomness of the bit stream output. In the preferred embodiment, the microprocessor tests the ratio of ONES bits to ZERO bits of the random number such that a desired 1:1 ONES/ZERO ratio is approximated.

25 Claims, 2 Drawing Sheets

RANDOM NUMBER GENERATOR WITH DIGITAL FEEDBACK

BACKGROUND OF THE INVENTION

1. Field of the Invention

The present invention generally relates to random number generators which are frequently used in encryption systems. More particularly, the present invention pertains to a method and apparatus for ensuring a specified degree of randomness of binary data generated from a zener diode random noise source.

2. Description of the Prior Art

Recently there has been an increased demand for digitally-encrypted voice communications over land-line and radio frequency channels. These voice security systems utilize random numbers to generate a cryptovariable or "session key" for a DES (digital encryption standard) or similar device. The random numbers can also be tested for primality, and used to derive a modulus for "public key" encryption systems used in a stand-alone mode or as part of a DES system.

Strictly speaking, it is possible for a cryptanalyst to decode any "deterministic" sequence, since as soon as he knows a complete cycle, the cryptanalyst can determine the entire sequence. No periodic sequence is truly random. For example, the standard pseudo-random number generator, consisting of shift registers and exclusive-OR gates, produces deterministic sequences which will eventually repeat. To ensure complete voice security, a random number generator must use a truly random or "nondeterministic" generation technique. Therefore, if the cryptanalyst intercepts part of the encrypted sequence, he will have no information on how to predict the remainder of the sequence.

A simple scheme to develop truly random numbers having non-deterministic statistical properties is the use of zener diode noise. If a zener diode is biased at the knee of the avalanche breakdown region of its current-voltage characteristic curve, it will exhibit a noisy behavior. The diode noise is then amplified, limited, and sampled to produce a random binary data stream derived from the random noise voltage. However, in practice, this scheme often produces random numbers having a statistical distribution exhibiting a degree of randomness which is skewed towards a majority of ONES or ZEROS, as determined by the zener diode biasing point. Since no two zener diodes have identical characteristic curves, each diode's bias voltage must be individually adjusted to find the point of maximum analog noise voltage. Furthermore, the bias voltage may need repeated readjustments due to changing environmental conditions, i.e., temperature and voltage, as well as component aging. Still further, the zener diode noise output is not Gaussian, and may have a mean value different from its median value. This anomaly complicates a limiter design, since the known technique of eliminating the average DC component by AC coupling the zener diode noise output will not result in a balanced data stream of ONES and ZEROS. Thus, an additional limiter balancing adjustment is often required in order to find the limiter switching threshold which provides the desired random ONE/ZERO mix.

A need, therefore, exists to provide a method and means for controlling the zener bias point and limiter threshold such that the random number output from the generator meets a given criteria for randomness.

SUMMARY OF THE INVENTION

Accordingly, a general object of the present invention is to provide an improved random number generator which outputs random numbers that meet a specified degree of randomness.

A more specific object of the present invention is to provide a digital feedback circuit which automatically adjusts the diode biasing point and the limiter threshold of a zener diode random number generator such that part-to-part tolerance, component aging, temperature variations, or voltage fluctuations will not adversely affect the randomness of the bit stream output.

These and other objects are achieved by the present invention which, briefly described, is a zener diode random number generator circuit which produces a random binary number output having a statistical distribution exhibiting a controlled degree of randomness which is determined in response to an input control signal. A microprocessor feedback circuit monitors the random number output and produces the input control signal in response to the difference between the degree of randomness of the output signal and that of a predetermined statistical distribution.

In the preferred embodiment, a zener diode noise source produces a noise signal having both a random noise component and an average DC component, both of which are responsive to a bias voltage. The noise signal is applied to a pulse shaping circuit which amplifies and limits the noise signal about a switching threshold, which is responsive to the limiter supply voltage, to produce a random pulse stream having randomness properties defined by both the random noise component and the average DC component. A microprocessor samples the random pulse stream over a particular time interval to provide a random binary number; and produces a feedback control signal in response to the difference between the ratio of ONE bits to ZERO bits of the binary number and a desired randomness ratio. The feedback control signal is then applied to a digital-to-analog converter/level translating circuit which corrects the bias voltage for the zener diode, as well as the supply voltage for the limiter, to approach the desired randomness ratio.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like-referenced numerals identify like elements, and in which:

DETAILED DESCRIPTION OF THE PREFERRED EMBODIMENT

Figure 1:
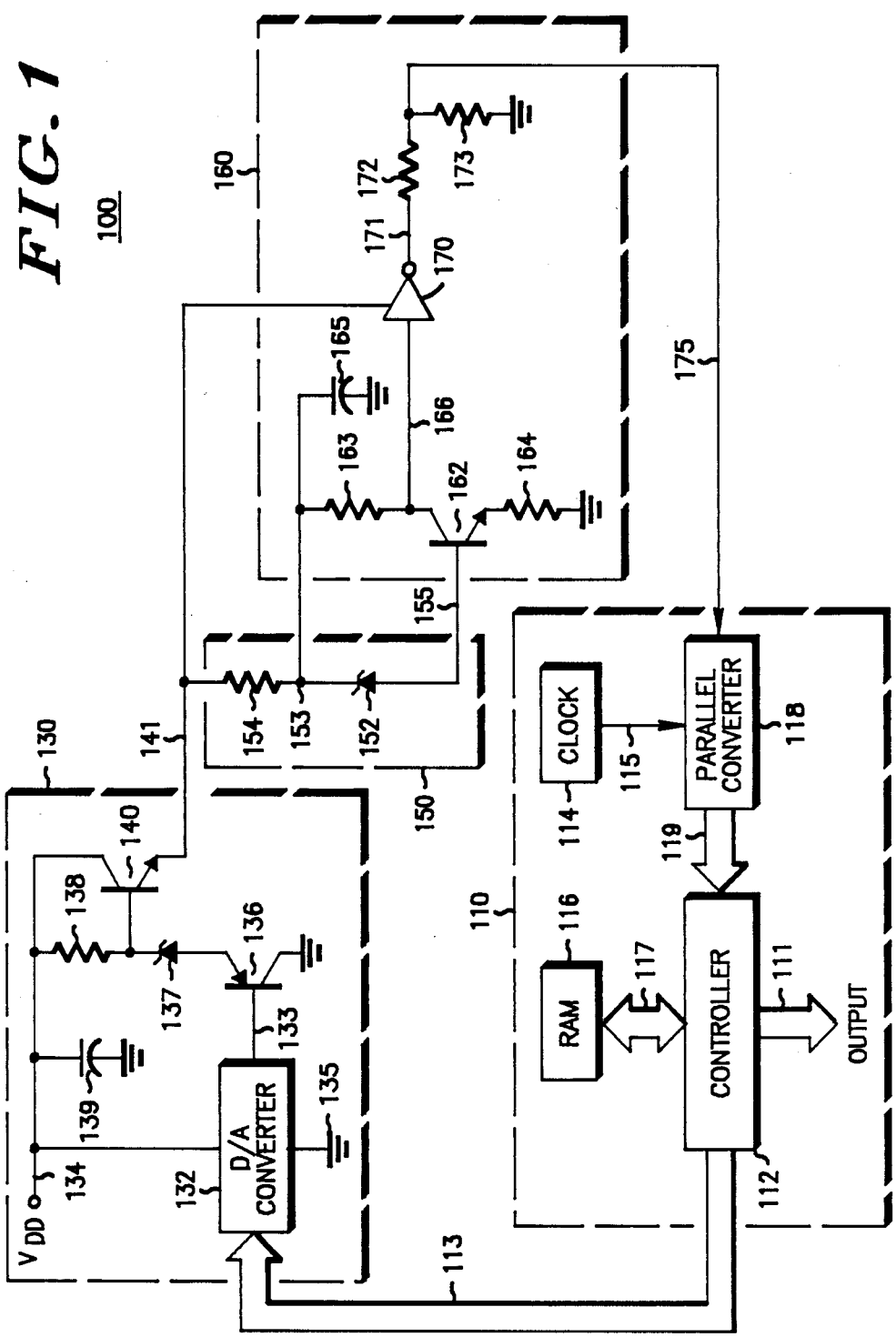
FIG. 1 is a detailed block diagram of the random number generator circuit according to the present invention.

Referring now to FIG. 1, random number generator circuit 100 is illustrated in accordance with the present invention. Circuit 100 is essentially comprised of controller block 110, bias circuit 130, noise source 150, and pulse shaping network 160. As shown in the figure, controller block 110 provides a digital feedback path to control the bias voltage of noise source 150 and the supply voltage of pulse shaping network 160.

Bias circuit 130 produces variable bias voltage 141 in response to digital control signal 113. Digital-to-analog (D/A) converter 132 translates digital control signal 113 into an analog control signal at 133. In the preferred embodiment, D/A converter 132 is an 8-bit D/A converter, such that analog control signal 133 has 256 possible voltage levels. The remainder of the circuitry functions as a discrete transistor voltage level translator. Analog control signal 133 is applied to the base of PNP transistor 136, which varies the voltage applied to the anode of zener diode 137. Supply voltage $V_{DD}$ at 134, which is +12 VDC in the preferred embodiment, furnishes the collector supply for transistor 40. Capacitor 139 serves as a power supply ripple filter. Transistor 140's base current is determined by the current through base resistor 138, zener diode 137, and transistor 136. In this manner, the voltage level translator enables the D/A converter to vary bias voltage 141 at the emitter of transistor 140 between approximately 9.1 VDC and 11.6 VDC.

Noise source 150 is comprised of zener diode 152 connected via resistor 154 to bias voltage 141. When bias voltage 141 is set to a level that just begins to cause conduction in zener diode 152, the diode is said to be operating at the "knee" of its avalanche region. It is at this knee bias point that the conducted current through the zener exhibits a noisy behavior. The small current through noise source zener 152 is then applied to pulse shaping block 160 as analog noise signal 155. Capacitor 165 ensures that node 153 remains at a constant DC voltage.

Analog noise signal 155 has both a random noise component and a DC component. The amplitude of the random noise component varies as a function of the biasing point of zener diode 152. If the zener diode is biased at the center of its knee region, this random noise amplitude will be maximized. The DC component of noise signal 155 is also dependent upon the biasing point of zener diode 152. If the zener diode is biased at one edge of its knee region, the analog noise voltage may appear as intermittent noise spikes, having an amplitude A, deviating from an average noise voltage B that is skewed from A/2. In other words, analog noise signal 155 could have its mean, i.e., the arithmetical average or center of gravity of the probability density function, offset from its median, i.e., the range midpoint or the value that divides the density function into two equal parts. Hence, the known technique of eliminating the average DC component by AC coupling the noise signal to the limiter will not necessarily result in a random data stream having an equal number of ONES and ZEROS. It is for this reason that the present invention DC couples analog noise signal 155 to the limiter while controlling the limiter input switching threshold.

Pulse shaping network 160 is comprised of an amplifier stage and a limiter stage. The amplifier stage comprises NPN transistor 162 and its associated bias resistors 163 and 164 arranged in a common-emitter amplifier configuration. The values of resistors 154, 163, and 164 have been chosen such that the collector bias voltage at 166 is maintained at approximately onehalf of the bias voltage 141. The limiter stage consists of CMOS inverter 170 which produces a binary output when the input voltage deviates around its input switching threshold. The supply voltage for inverter 170 is provided by bias voltage 141, such that its input switching threshold is approximately equal to one-half of the magnitude of bias voltage 141, while its binary output swing ranges from bias voltage 141 to ground 135. Resistors 172 and 173, connected to the output of inverter 170, translate the output swing of the pulse stream at 171 to a compatible level for input to digital logic, e.g., 0–5 VDC.

In operation, the current through zener diode 152 determines the base current of transistor 162, and hence, when multiplied by the gain $\beta$ of transistor 162, its collector current. If bias voltage 141 is slightly increased, more zener current will flow into the base to turn transistor 162 on harder, such that its average DC collector voltage at 166 will significantly decrease. At the same time, a slight increase in bias voltage 141 will result in a slightly higher input switching threshold for inverter 170, since its supply voltage has increased. Therefore, the result of the bias voltage increase is to adjust the average DC component of the amplified noise signal at 166 and the input switching threshold of the limiter together to create a more symmetrical limiter output. In other words, both the amplitude of analog noise signal 155 and the input switching threshold of inverter 170 are responsive to variations in bias voltage 141. Since these parameters determine the statistical regularity of the percentage of ONES pulses vs. ZERO pulses, the randomness of random pulse stream 175 is also dependent upon variations in bias voltage 141.

Controller block 110 is comprised of controller unit 112 with its associated output data bus 111, clock 114, random access memory (RAM) 116, and serial-to-parallel converter 118. The controller block has been shown in FIG. 1 as comprised of these individual elements for purposes of illustration only. In the preferred embodiment, the function of the entire controller is performed by a microprocessor. The sequence of operations performed by the microprocessor will subsequently be described in detail. However, in general terms, the operation of controller block 110 may be described as follows.

First, parallel converter 118 samples random pulse stream 175 at particular time intervals defined by clock signal 115, and shifts-in a given number of the random pulses as binary data bits. Second, controller unit 112 loads the given number of bits in parallel from converter via data bus 119, thus defining a random binary number. Third, the controller unit performs one or more tests for randomness on the binary number. Fourth, the controller may store the test results in RAM via data bus 117, and repeat the tests on additional binary numbers to obtain a wider sampling. Finally, the controller decides whether to output a random binary number that passes the tests via output data bus 111, or to output a digital control signal at 113 which will change bias voltage 141 to the proper value which will result in binary numbers that pass the tests. Hence, it can now be seen that random number generator circuit 100 produces binary numbers which meet a specified criteria for randomness. A representative set of component values for random number generator circuit 100 are listed below:

| Resistor 138 | 8.2K |
|---|---|
| Resistor 154 | 2.2K |
| Resistor 163 | 15K |
| Resistor 164 | 100 |
| Resistor 172 | 5.6K |

| | |
|---|---|
| Resistor 173 | 4.7K |
| Capacitor 139 | 15uF |
| Capacitor 165 | 2.2uF |
| Transistor 136 | PNP silicon |
| Transistor 140 | NPN silicon |
| Transistor 162 | NPN silicon ($\beta > 150$) |
| Zener diode 137 | $V_z = 9.1$ VDC |
| Zener diode 152 | $V_z = 9.1$ VDC |
| Controller 112 | Motorola MC6803 8-bit microcomputer |
| RAM 116 | Motorola MCM6164 8Kx8 CMOS static RAM |
| Converter 118 | Motorola MC14015 8-bit shift register |
| D/A converter 132 | Analog Devices AD558 8-bit D/A |
| Inverter 170 | Motorola MC14049 CMOS Hex inverter |

Before proceeding with a description of the microprocessor software, it should first be shown what is meant by "randomness". A random experiment is one that can be repeated a large number of times under similar circumstances, but which yields unpredictable results at each trial. The most familiar example of a random binary sequence arises from tossing an unbiased coin repeatedly and writing ONE when it is heads and ZERO for tails. Three randomness postulates for a binary sequence of period P are cited in Beker, H. And Piper, F., *Cipher Systems—The Protection of Communications*, (New York, John Wiley & Sons, 1982), pp. 169-170. The first states that if P is even then the cycle of length P shall contain an even number of ZEROS and ONES, and if P is odd then the number of ZEROS shall be one more or less than the number of ONES.

If binary number sequences of length less than a complete period P are to be used in encryption systems, then any partial sequence intercepted by a cryptanalyst should also appear to be random. Hence, it is important to apply statistical tests to sections of the sequence to decide if they are random enough for a particular purpose. Five statistical tests for local randomness are also listed in the aforementioned Beker reference. Although any or all of the tests may be used, the controller of the preferred embodiment tests the random number for approximately a 50% mix of ONES and ZEROS. This test has been shown to be appropriate to ensure that the bias point of a zener diode random number generator has not drifted from the optimum point on the knee of the avalanche curve.

The randomness test used in the preferred embodiment ensures that there is roughly the same number of ONES and ZEROS in the sequence. If the sequence of N contains $N_0$ ZEROS and $N_1$ ONES, then the microprocessor tests whether:

absolute value$[N_0-N_1]<$LIMIT wherein LIMIT represents the acceptable variation from the ideal 1:1 ratio.

Figure 2:
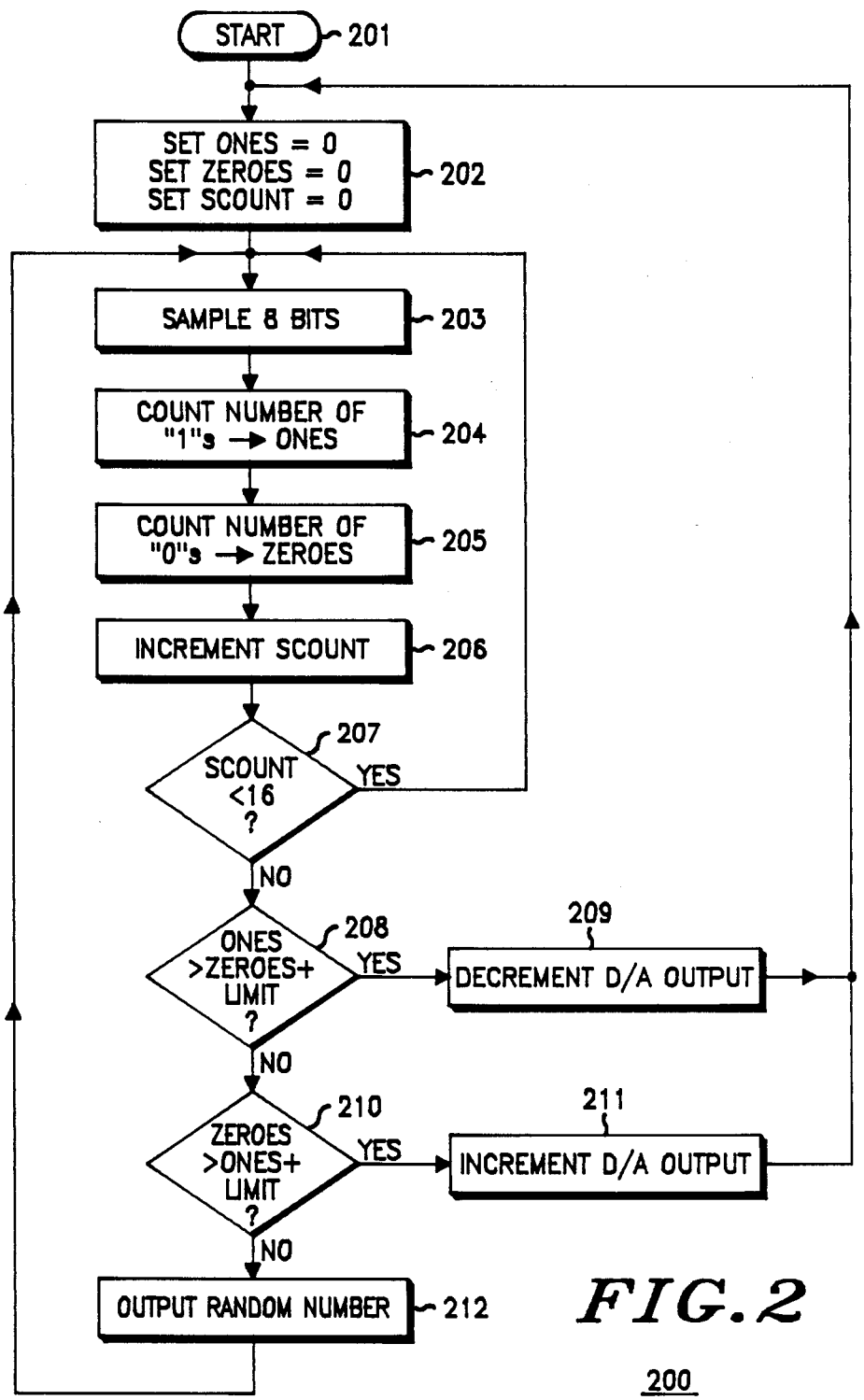
FIG. 2 is a flowchart illustrating the specific sequence of operations performed by the controller block of FIG. 1.

Referring now to FIG. 2, a flowchart illustrating the specific sequence of operations performed by controller block 110 is shown. In the preferred embodiment, a microprocessor performs the aforementioned randomness test in software, such that flowchart 200 represents its program. However, if a different randomness test is desired, or if controller 112 were implemented in digital logic, then the flowchart would be modified accordingly. In either case, the controller produces a feedback control signal 113 to the D/A converter in a manner to correct the degree of randomness if the random binary number at 119 fails the chosen test.

Beginning with start block 201, the controller initializes the variables ONES, ZEROS, and SCOUNT to zero in block 202. At block 203, the random pulse stream at 175 is sampled and 8 bits of the resultant bit stream are input. In block 204, the number of ones bits of the 8-bit sample are counted and added into the variable ONES, and in block 205 the number of zero bits are counted and added to the variable ZEROS. The variable SCOUNT, which is used to keep track of the number of samples since the last adjustment of the D/A, is incremented. SCOUNT is then tested in block 207. If the number of samples is less than 16, i.e., 128 bits, then the program returns to block 203 to sample another 8 bits. This sample counting is performed to ensure that enough bits are sampled to make a valid randomness decision.

Upon the completion of counting the ones and zeros of 16 8-bit samples, the ONES variable is tested against the ZEROS variable in block 208 If the number of ones in the 128 bits is more than a predefined limit over the number of zeros, then the microprocessor will decrement the D/A converter in block 09 to lower control voltage 133. Conversely, in block 210, the number of zeros is tested to see if it is more than a predefined limit over the number of ones. If so, the microprocessor will increment the D/A converter in block 211 to raise control voltage 133. If the difference between the ONES and the ZEROS is less than the prescribed limit, then the D/A is not adjusted and the most recent 8-bit sample is output in block 212. If more than 8 bits are required at a time, then the 8-bit number would be stored in RAM until enough 8-bit numbers are accumulated. Control then returns to block 203 to input another 8-bit sample.

Eventually, after several random numbers have been saved, the program will automatically update the D/A output. Since the difference limit is fixed, i.e., limit=64 in the preferred embodiment, it will become progressively harder to meet the difference criteria as more samples are accumulated in SCOUNT. Hence, the program constantly searches for the optimum D/A output to produce the desired 50% mix. This self-updating aspect of the program is particularly desirable, since D/A converters have a discrete number of output levels and the exact biasing level to produce a 50% mix may fall between two adjacent D/A output levels. If this aspect is not desired, control from block 212 should return to initialization block 202 instead of sampling block 203. Other modifications to the controller operation may be useful in various applications. For example, it may be desired that the microprocessor devote less time to the random noise generating task. The program could be modified such that the microprocessor would make several infrequent adjustments, then let the zener diode circuit free-run for a predetermined length of time while the microprocessor services other programs. Alternately, the program could be interrupt-driven based on the contents of a buffer of fresh random numbers. When the buffer is nearly empty, an interrupt flag would be set to call the random number generating program.

In summary, a method and means for controlling the zener bias point and limiter threshold of a zener diode random noise generator has been described. The circuit of the present invention provides digital feedback which automatically adjusts the diode biasing point and the limiter threshold such that part-to-part tolerance, component aging, temperature variations, or voltage fluctuations will not adversely affect the randomness of the bit stream output. The circuit outputs random numbers that meet a specified degree of randomness.

While only particular embodiments of the present invention have been shown and described herein, it will be obvious that further modifications may be made without departing from the invention in its broader aspects, and accordingly, the appended claims are intended to cover all such changes and alternative constructions that fall within the true scope and spirit of the invention.

What is claimed is:

1. A random number generator having a controlled degree of randomness comprising:
    noise source means for producing an analog noise signal having a statistical distribution exhibiting a particular degree of randomness determined in response to an input control signal;
    pulse shaping means for generating random binary data in response to said analog noise signal;
    feedback means for monitoring said random binary data and for producing said input control signal in response to the difference between the degree of randomness of said binary data and that of a predetermined statistical distribution; and
    control means for outputting said random binary data only when it is within prescribed limits of said degree of randomness of said predetermined statistical distribution.

2. The random number generator according to claim 1, wherein said noise source means includes a zener diode having a bias point at the knee of the avalanche breakdown region of its characteristic curve so as to generate random noise, said bias point being responsive to said input control signal.

3. The random number generator according to claim 1, wherein said pulse shaping means includes a limiter device having an input switching threshold defined in response to its supply voltage, and wherein said feedback means includes means for varying said limiter supply voltage.

4. The random number generator according to claim 3, wherein both said analog noise signal and said limiter supply voltage are responsive to changes in said input control signal.

5. The random number generator according to claim 1, wherein said feedback means includes a microprocessor which produces said input control signal in a digital format, and further includes a digital-to-analog converter which produces a variable bias voltage in response to said digital input control signal.

6. The random number generator according to claim 1, wherein said predetermined statistical distribution exhibits a ratio of ONES bits to ZEROS bits which is approximately equal to 1:1.

7. A circuit for generating random binary numbers which meet a given criteria for randomness comprising:
    circuit means for producing a bias voltage in response to a control signal;
    noise source means for producing an analog noise signal having a random noise component and an average DC component, both of which are responsive to said bias voltage;
    pulse shaping means for amplifying and limiting said analog noise signal to product a digital pulse stream having randomness properties defined by both said random noise signal; and
    controller means for sampling said digital pulse stream for a particular time interval to provide a random binary number, and for producing said control signal in response to the difference between desired randomness criteria of said random binary number and said given criteria for randomness.

8. The circuit according to claim 7, wherein said controller means produces said control signal in a digital format, and wherein said circuit means includes a digital-to-analog converter for varying said bias voltage in response to said digital control signal.

9. The circuit according to claim 7, wherein said noise source means includes a zener diode having a bias point at the knee of the avalanche breakdown region of its characteristic curve so as to generate random noise, said bias point being determined by said bias voltage.

10. The circuit according to claim 7, wherein said pulse shaping means includes a limiter device having an input switching threshold defined in response to its supply voltage, and wherein said controller means includes means for varying said limiter supply voltage.

11. The circuit according to claim 10, wherein both said analog noise signal and said limiter supply voltage are responsive to changes in said bias voltage.

12. The circuit according to claim 7, wherein said controller means is a microprocessor which determines the acceptability of said random binary number with respect to the desired randomness criteria of a predetermined statistical distribution and outputs said random binary number only if it is within prescribed limits of said desired randomness criteria.

13. The circuit according to claim 7, wherein said desired randomness criteria is the difference between the number of ONES bits and ZEROS bits of said random binary number.

14. The circuit according to claim 13, wherein said predetermined statistical distribution exhibits a ratio of ONES bits to ZEROS bits which is approximately equal to 1:1.

15. The circuit according to claim 13, wherein said controller means determines the acceptability of said random binary number by testing whether the difference between the number of ONES bits and ZEROS bits of said random binary number is less than a predetermined limit.

16. A method of generating random binary numbers which meet a desired criteria for randomness comprising the steps of:
    generating an analog noise signal having a random noise component and an average DC component, both of which are responsive to a variable bias voltage;
    amplifying and limiting said analog noise signal to produce a digital pulse stream having randomness properties defined by both said random noise component and said average DC component of said analog noise signal;
    sampling said digital pulse stream for a particular time interval to provide a random binary number;
    measuring desired randomness criteria of said random binary number;
    determining the acceptability of said random binary number with respect to the desired randomness criteria of a predetermined statistical distribution;

outputting said random binary number only if it is within prescribed limits of said desired randomness criteria; and varying said bias voltage in a manner to direct the randomness properties of said digital pulse stream to approach said desired randomness criteria if said random binary number is not within said prescribed limits.

17. The method according to claim 16, wherein said noise signal generating step is performed by a zener diode having a bias point at the knee of the avalanche breakdown region of its characteristic curve so as to generate random noise, said bias point being determined by said variable bias voltage.

18. The method according to claim 16, wherein said limiting step is performed by a limiter device having an input switching threshold which is also responsive to said variable bias voltage.

19. The method according to claim 16, wherein said determining step determines the acceptability of said random binary number by testing whether the difference between the number of ONES bits and ZEROS bits of said random binary number is less than a predetermined limit.

20. A random number generator having a controlled degree of randomness comprising:
noise source means for producing an analog noise signal having a statistical distribution exhibiting a particular degree of randomness determined in response to an input control signal, said noise source means including a zener diode having an adjustable bias point near the knee of the avalanche breakdown region of its characteristic curve so as to generate random noise, said adjustable bias point being responsive to said input control signal;
pulse shaping means for generating random binary data in response to said analog noise signal; and
feedback means for monitoring said random binary data and for producing said input control signal in response to the difference between the degree of randomness of said binary data and that of a predetermined statistical distribution.

21. The random number generator according to claim 20, wherein said pulse shaping means includes means for limiting said analog noise signal to provide said random binary data, said limiting means having an adjustable input switching threshold.

22. The random number generator according to claim 21, wherein said feedback means includes means for adjusting both said zener diode bias point and said limiting means input switching threshold.

23. A random number generator having a controlled degree of randomness comprising:
noise source means for producing an analog noise signal having a statistical distribution exhibiting a particular degree of randomness determined in response to an input control signal;
pulse shaping means for generating random binary data in response to said analog noise signal, said pulse shaping means including means for limiting said analog noise signal to provide said random binary data, said limiting means having an adjustable input switching threshold responsive to said input control signal, wherein said random binary data has a statistical distribution exhibiting a particular degree of randomness determined in response to said input control signal; and
feedback means for monitoring said random binary data and for producing said input control signal in response to the difference between the degree of randomness of said binary data and that of a predetermined statistical distribution.

24. The random number generator according to claim 23, wherein said noise source means includes a zener diode having an adjustable bias point near the knee of the avalanche breakdown region of its characteristic curve so as to generate random noise, said adjustable bias point being responsive to said input control signal, wherein said analog noise signal has a statistical distribution exhibiting a particular degree of randomness determined in response to said input control signal.

25. The random number generator according to claim 23, wherein said feedback means includes means for determining the acceptability of said random binary data with respect to the desired randomness criteria of said predetermined statistical distribution, and for outputting said random binary data only when it is within prescribed limits of said degree of randomness of said desired randomness criteria.

* * * * *

UNITED STATES PATENT AND TRADEMARK OFFICE
CERTIFICATE OF CORRECTION

PATENT NO. : 4,853,884

DATED : August 1, 1989

INVENTOR(S) : Daniel P. Brown, et al

It is certified that error appears in the above-identified patent and that said Letters Patent is hereby corrected as shown below:

Claim 7, column 8, line 2, after "noise" insert --component and said average DC component of said analog noise--.

Signed and Sealed this

Nineteenth Day of June, 1990

*Attest:*

HARRY F. MANBECK, JR.

*Attesting Officer*      *Commissioner of Patents and Trademarks*